United States Patent [19]
Van Der Mude

[11] Patent Number: 5,560,615
[45] Date of Patent: Oct. 1, 1996

[54] FISHING GAME ON MANAGED HABITAT

[76] Inventor: Philip Van Der Mude, 20295 SW. 296th St., Homestead, Fla. 33030-7637

[21] Appl. No.: 338,672

[22] Filed: Nov. 14, 1994

[51] Int. Cl.⁶ .................................................. A63B 71/02
[52] U.S. Cl. ......................................... 273/444; 273/447
[58] Field of Search ................................... 273/140, 459, 273/440, 441, 444, 447; 43/4.5; 119/200, 215

[56] References Cited

U.S. PATENT DOCUMENTS

| | | | |
|---|---|---|---|
| 1,640,259 | 8/1927 | Vallat | 273/140 |
| 2,703,469 | 3/1955 | Raizen | 273/447 |
| 4,648,194 | 3/1987 | Carrol | 43/4.5 |
| 4,862,626 | 9/1989 | Hamaguchi | 43/4.5 |
| 5,186,466 | 2/1993 | Mudd et al. | 273/287 X |
| 5,207,424 | 5/1993 | Bleam et al. | 273/140 |
| 5,340,120 | 8/1994 | Holyoak | 273/447 |

*Primary Examiner*—William E. Stoll
*Attorney, Agent, or Firm*—Robert J. Van Der Wall

[57] ABSTRACT

A game for measuring and ranking the sport fishing skills of players, played on a course including a body of water having several designated and marked fishing locations, includes the steps of fishing at a given fishing location until a fish is caught, proceeding to the next fishing location until all fishing locations are fished, recording the number of casts required to catch a fish at each fishing location, and computing scores for each player based at least in part on the total number of casts made by each player. The game preferably additionally includes the steps of weighing fish caught by each player and computing scores at least in part on the weight of the caught fish. Where the course additionally includes a hazard for increasing the level of difficulty in fishing at a fishing location, the steps preferably additionally include negotiating the hazard while fishing at the location. A course for playing a game for measuring and ranking the sport fishing skills of players includes a body of water having a either nine or eighteen designated fishing locations. The course preferably additionally includes hazards for increasing the difficulty of fishing at one fishing location.

4 Claims, 2 Drawing Sheets

FISHING GAME ON MANAGED HABITAT

BACKGROUND OF THE INVENTION

1. Field of the Invention:

The present invention relates generally to the field of outdoor sports. More specifically it relates to a fishing skill game which is intended to parallel a golf game in terminology and in certain broad procedural aspects. This game includes a special and inventive playing course including a large pond having either nine or eighteen designated fishing locations called habitats. The numbers of habitats correspond to the numbers of holes on conventional golf courses. Various hazards are created such as logs, rocks, plants or an anchored vessel near shore which the players must negotiate when casting, analogous to sand traps and lakes in golf courses. The game rules specify the range of sizes and types of fishing rods and lures permitted. Each player fishes at a habitat until he or she catches a fish. The number of casts made to catch the fish are recorded and the fish is stored in a cooler. Then the player moves on to the next habitat in the series, until he or she has played the entire course. Points are awarded based on the weight of the fish a player has caught and also based upon the total number of casts they have made. The highest raw numbers of points are earned by those catching the largest fish with the fewest casts. Then points are deducted as penalties for such errors as the loss of a lure and improper hooking. There are two embodiments of the inventive game, one being for ordinary recreation and the other for professional competition.

2. Description of the Prior Art

There have long been fishing competitions which purportedly identify the most skilled player. These competitions have generally had loosely defined rules which do not make skill alone decisive. For example, no previous competition has been known to account for the number of casts made by each player, even though more casts can offset a lack of skill. Another problem has been that fishing in the wild cannot be reliably offset by population control. Complex natural ecosystems and habitats can be destroyed.

It is thus an object of the present invention to provide a fishing competition game which limits playing success as much as possible to demonstrated skill, where equipment used such as tackle is regulated and the final score depends in part of the number of casts made.

It is another object of the present invention to provide such a game which is played on a course where individual performance can be closely monitored and which equalizes the obstacles encountered by the players.

It is still another object of the present invention to provide such a game which parallels in several ways the game of golf, to give players and observers a familiar frame of reference to quickly understand the game and an appealing sense of parody.

It is finally an object of the present invention to provide such a game which is ecologically managed and environmentally friendly.

SUMMARY OF THE INVENTION

The present invention accomplishes the above-stated objectives, as well as others, as may be determined by a fair reading and interpretation of the entire specification.

A game is provided for measuring and ranking the sport fishing skills of players, played on a course including a body of water having several designated and marked fishing locations, including the steps of fishing at a given fishing location until a fish is caught, proceeding to the next fishing location until all fishing locations are fished, recording the number of casts required to catch a fish at each fishing location, and computing scores for each player based at least in part on the total number of casts made by each player. The game preferably additionally includes the steps of weighing fish caught by each player and computing scores at least in part on the weight of the caught fish. Where the course additionally includes a hazard for increasing the level of difficulty in fishing at a fishing location, the steps preferably additionally include negotiating the hazard while fishing at the location.

A course is provided for playing a game for measuring and ranking the sport fishing skills of players, including a body of water having a either nine or eighteen designated fishing locations. The course preferably additionally includes hazards for increasing the difficulty of fishing at one fishing location. The hazard may include several rocks, or plants, or logs, or a water vessel, or pilings or duck buoys. The course preferably also includes equipment for monitoring the number of fish present in the body of water.

BRIEF DESCRIPTION OF THE DRAWINGS

Various other objects, advantages, and features of the invention will become apparent to those skilled in the art from the following discussion taken in conjunction with the following drawings, in which.

DETAILED DESCRIPTION OF THE PREFERRED EMBODIMENTS

Figure 1:
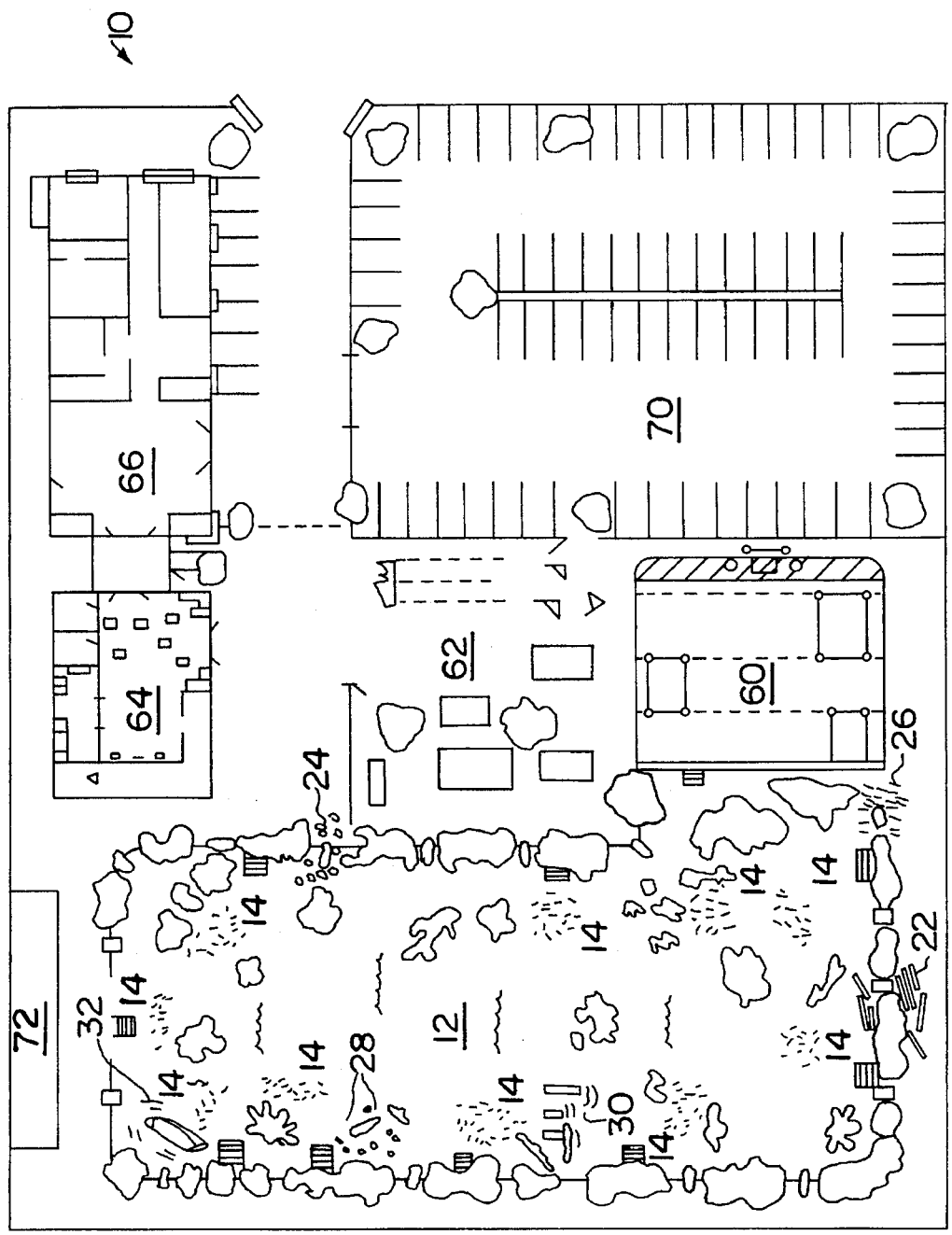
FIG. 1 is a top, areal view of the inventive course and surrounding property, showing the relative positions of the habitats and hazards, and visitor faicilities.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Referring to FIG. 1, a recreational fishing skill game is disclosed, which is played on a course 10 including a pond 12, perhaps two acres in size, having either nine or eighteen designated fishing locations, called habitats 14. Pond 12 is stocked with a desired sport fish, such as striped bass. The numbers of habitats 14 correspond to the number of holes on a conventional golf course. Various hazards are created along the shore and off-shore at these habitats 14, such as clusters of logs 22, rocks 24, matted plants 26, floating duck buoys 28, dock pilings 30 or an anchored vessel 32, analogous to the sand traps and lakes in golf courses. The matted plants 26 hazard may be tall grasses or lilies, for example. Many other hazards are contemplated. Players must negotiate these hazards when casting. Players fish at each habitat 14 until they catch a fish, and the players with the fewest casts and the largest fish by weight score the highest, unless their scores are reduced by penalties.

Equipment

The game rules begin with regulations defining the permitted range of sizes and types of fishing rods and lures to be used. The specific equipment described here is not necessary to play the disclosed game, but merely preferred, and should not be construed as limiting.

Each player receives one spinning outfit, including a fixed spool reel on a fishing rod between three feet and ten feet long which is able to cast lures. The maximum line breaking strength is twelve pound test. Each player receives one bait casting outfit, including a revolving spool reel on a fishing rod between five and fourteen feet long which is able to cast lures. The maximum line breaking strength is again twelve pounds. Finally, each player receives one fly casting outfit, including a revolving spool reel on a fishing rod between five feet and fourteen feet long that is able to cast lures propelled by line weight. The line has a maximum breaking test of twelve pounds.

Lures are also provided, but each lure must have no more than four sets of gang hooks. No method-specific snagging devices are permitted.

Lures are provided in unlimited quantities. Only one lure unit is permitted on a line for each cast. The use of hormones and scents are permitted.

A fish cooler is provided for each player to retain caught fish in edible condition. Identification tags are provided each player to mark his or her fish. A sanitary fish processing chute is additionally provided.

Finally, each player is provided with a scoring sheet or other tabulating device.

Course

Figure 2:
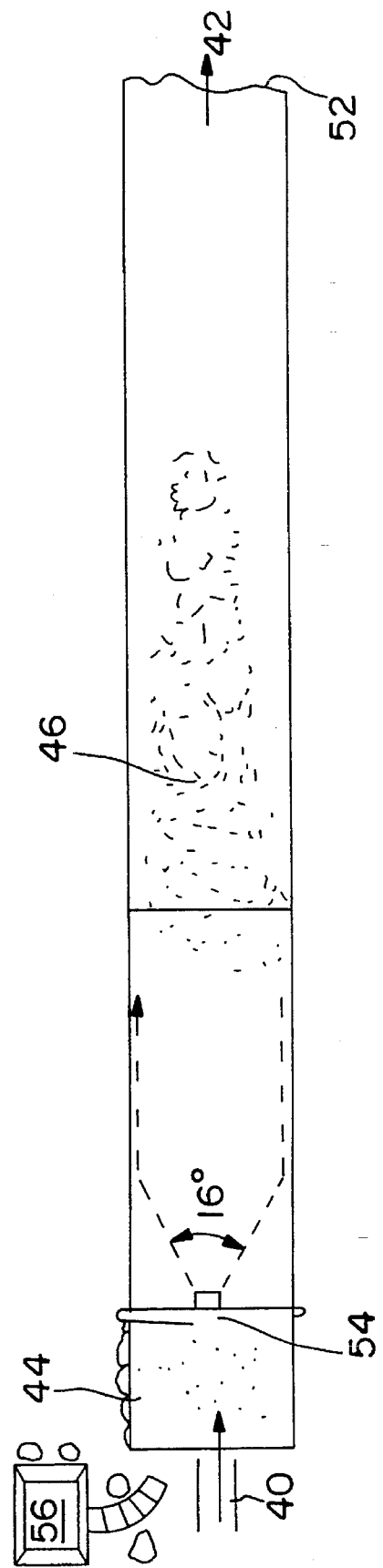
FIG. 2 is a top, areal view of a fish farm, revealing the fish inventory control elements.

The arena or playing course 10 includes a body of water in the form of a pond 12 preferably owned by the course 10 providers. The pond 12 is managed so that the types and numbers of fish retained there is maintained at a substantially constant level. Inventory control in the farm is preferably achieved using a Si-Tex No. CVS-106 processor and transducers. The transducers are placed on the up-current side of a fish run on fry screen. See FIG. 2, where elements have the following reference numbers: 40 fresh water, 42 run-off effluent, fry baby fish 44, growing fish 46, metal gate 52, transducers 54, computer room 56. The Si-Tex No. CVS-106 processor, housed within computer room 56, displays fish in school formation on a color video screen. The formation coloring indicates fish density, weight and size. The video display is fed from the processor by a NTSC or RJB which can be tapped and fed into an "MJPEG" video capture card. The video is then displayed on the monitor. The time, date, and range are then stored in the file for that run, then the next transducer 54 in the series is activated and that data is stored as well, until all runs are covered. One Si-Tex processor and possibly fifty transducers are preferably used.

The theory behind this assembly is that under natural conditions, a sixteen inch cone would collapse (reflect) within ten feet with the run dimensions. Yet because of water movement in the direction of sonic movement and the lack of surface waves, and the relatively smooth concrete bottom and plastic walls, the cone should "skip" and proceed forward, thus enabling measurement of the fish.

As to the program, after running some shape and color comparisons to actual weight, the programmer can select some parameters to create a line graph showing daily growth for a month, or for several months. Weekly growth for three quarters monthly growth for two years, this being for species needing a higher weight to achieve a good sport.

As to the pond 12 design, it is divided into either nine or eighteen habitat 14. The pond 12 fish population is checked with PPI sonar. A transducer 54 is placed in a central pond location at exactly mid-depth. Transducer 54 sends information to computer room 56, including a historical 360 degree picture in eleven seconds. Again tapping into the video display at the "RJB" from the processor and routing it through a "MSPEG" into an I.B.M. clone. This data is stored in the computer.

The pond 12 takes any of many possible shapes, is of any length up to 500 feet, per transducer, and is artificially formed so that a smoother surface than is possible in nature is achieved and some wind protection can be provided to minimize surface disturbance. This construction makes possible reliance on sonic skips broadcasting the transducer 54.

The resulting image is shape-specific and displayed in only light and dark contrasts. Constants, such as fixed habitats and structures, are taken into account. All the program needs to do is to count the total number of returns and subtracts the constants, yielding the fish population in numerical form. Television or other video cameras may be provided at each habitat 14 to confirm the cast count, for a still photo count.

The fish farm 60, mentioned above, is provided on property adjacent to course 10. Also provided are a picnic area 62, a restaurant, snack bar area 64, an office complex 66 for managers, and an ample parking lot 70 for visitors and competitors. Viewing stands 72 are provided for visitors.

Method: Rules of Play

In practicing the invention, the following method may be used. The objective of the game is to catch the largest fish possible at each habitat 14 with the fewest possible casts. Certain tackle is specified for use at each habitat 14, and players must use the specified tackle. Each player fishes at a given habitat 14 until he catches a fish, then moves on to the next habitat 14 until he catches a fish, until he has completed the course 10. The player records the number of casts made to catch each fish, as well as the total weight of the fish caught, on the supplied chart or other device.

Where there is only one player, the player begins with the habitat numbered "one" and proceeds numerically through the sequence of habitats 14. Where there are two players, a coin is tossed to determine who will be first caster at the first habitat 14. Casts are alternated between players while they are both at any given habitat 14.

Where there are three or more players, a combination of one and two player rules may be followed. For example, the group may be divided into two groups, even if the numbers of players in the two groups are unequal. Then the game is played and cumulatively scored as if each of the two groups were one of two players.

It may happen that a player is so slow in catching his fish at a given habitat 14 that other players are kept waiting. In this circumstance, the slow player is required to stand aside and wait until the other players finish at that habitat 14.

Points are awarded based on the total weight of the fish caught and also based upon the number of casts. The highest numbers of raw points are earned by those catching the largest fish with the fewest casts. Professional average results, or PAR, are determined in advance for the course, both for the number of casts and for the weight of fish caught there.

For every cast over the PAR number of casts, one point is subtracted. For every cast under PAR, one point is added. Equaling PAR earns one half point.

For every pound under PAR weight, one half point is subtracted. For every pound over PAR weight, one half point is added. Equaling PAR earns one half point.

Then points are deducted as penalties for errors. If a player looses a lure, play is stopped at a given habitat 14 and there is a three cast penalty. Furthermore, no fish weight is recognized for that habitat 14. If a hook is not embedded in the mouth of the fish, play is stopped at that habitat 14 for foul hooking and no fish weight is recognized at that habitat 14. If the specified tackle is not used, there is a two cast per habitat 14 penalty. To determine a player's final score, the points are added for pounds and casts and then the penalties are subtracted. The player with the highest final score wins, second highest places second, and so forth.

Second Preferred Embodiment

A professional competition game is also provided, which is like the recreational version but with the following differences. The course 12 has eighteen tackle-specific habits 14, separated by submerged screen barriers.

Equipment

Once again, the game has regulations which define the permitted range of sizes and types of fishing rods and lures to be used. The specific equipment described here is not necessary to play the disclosed game, but merely preferred and should not be construed as limiting.

Each player receives one spinning outfit, including a fixed spool reel on a fishing rod between our feet and eight feet long which is able to cast lures. The maximum line breaking strength is four pound test. Each player receives one bait casting outfit, including a revolving spool reel on a fishing rod between four and eight feet long which is able to cast lures. The maximum line breaking strength is eight pounds. Finally, each player receives one fly casting outfit, including a revolving spool reel on a fishing rod between six feet and eleven feet long that is able to cast lures propelled only by line weight. A section of line "tippet" having a length between one and three feet is provided, having a breaking test of four pounds. This tippet must be the only connection between fly and fly line.

Lures are also provided, but only one per outfit, per competition. No lures may be brought to the course 12. Each lure must have no more than two sets of gang hooks. No method specific snagging devices are permitted. Only direct line to lure attachment is permitted; no snaps or swivels. Re-tying of lures is permitted at any time, as is changing the line spool, as long as the line remains of the specified test strength. The fly leader can be nine feet long, and incorporate no less than a one foot section of four pound maximum breaking test. Only one unit of lure is permitted on a line for each cast. The use of hormones and scents is permitted.

A fish cooler is provided for each player to retain caught fish in edible condition. A caddie may assist players in carrying equipment and in handling caught fish. Identification tags are provided each player to mark his or her fish. A sanitary fish processing chute is additionally provided. Finally, each player is provided with a scoring sheet or other tabulating device.

Method: Rules of Play

In practicing the invention, the following method may be used. The objective of the game is to catch the largest fish possible at each habitat 14 with no more than four casts. Certain tackle is specified for use at each habitat 14, and players must use the specified tackle. Each player fishes at a given habitat 14 until he or she either catches a fish or reaches a total of four casts for that habitat 14, and then moves on to the next habitat 14 until he or she has played each habitat 14 in the course 12.

Players are permitted two hours to walk through and inspect the course 10, with no equipment, prior to competition. Then players choose three lures. The players all start simultaneously on different habitats 14, preferably as follows:

| Player | | Starting Habitat | |
|---|---|---|---|
| " | 1 | " | 1 |
| " | 2 | " | 3 |
| " | 3 | " | 5 |
| " | 4 | " | 7 |
| " | 5 | " | 9 |
| " | 6 | " | 11 |
| " | 7 | " | 13 |
| " | 8 | " | 15 |
| " | 9 | " | 17 |

Players are assigned numbers randomly, such as by drawing numbered cards from a fish bowl. Players start at a referee's signal, and play 18 habitats in sequence, tabulating casts and retaining fish for weigh-in.

Where there are eighteen players, one player begins at each habitat 14, again by random number selection. The players play eighteen habitats in sequence.

The raw score is determined by adding points for number of casts as follows: a catch with a single cast receives 80 points, with two casts receives 60 points, with three casts receives 40 points, and with four casts receives 10 points. The points for fish weight is determined by determining the total weight of fish caught by each player in whole ounces. This number is multiplied by two to computer weight points. In the event of a tie, the equal scoring players have a final, separate competition at habitats selected by the referee.

Points are deducted as penalties for errors. If a player looses a lure, zero points are recorded at that habitat 14 and the player looses the right to use that particular outfit for the rest of the competition. A thirty point penalty is also assessed against that player for the particular habitat 14 where the lure is lost, and also for each habitat 14 requiring the surrendered outfit following the penalty. These habitats 14 can, however, be played with one of the other outfits. Where a player looses all outfits, the game ends for them and a final Score of zero is recorded for that player.

If a hook is not embedded in the mouth of the caught fish for any habitat 14, no fish weight point are recorded. Cast points for that habitat 14 are counted, however.

Where teams rather than individuals compete, each team is to include one head coach, three assistant coaches and six players. Two teams play per competition, home versus visitor. The competition begins with coaching staffs being permitted one hour to walk the course carrying no equipment. Each coach chooses two players and their lures and sends them out to begin playing. The assignment of habitats 14 is preferably as follows:

For visitors:

Player number 1 plays habitat number 1.

Player number 2 plays habitat number 2.

For home players:

Player number 1 plays habitat number 9.

Player number 2 plays habitat number 10.

The players play through three habitats each, and then receive a two minute time out period, during which the coaches outfit a second set of players.

For visitors:

Player number 3 plays habitat number 16.

Player number 4 plays habitat number 7.

For home players:

Player number 3 plays habitat number 14.

Player number 4 plays habitat number 8.

All three players complete three habitats 14 each, and then receive a two minute time out period, during which the coaches outfit the final set of players.

For visitors:

Player number 5 plays habitat number 3.

Player number 6 plays habitat number 5.

For home players:

Player number 5 plays habitat number 2.

Player number 6 plays habitat number 6.

Strategy is provided to their players by assistant coaches. Players 1 and 2 play 18 habitats 14; players 3 and 4 play 15 habitats 14; and players 5 and 6 play 12 habitats 14, all in numerical sequence. In the event of a tie, coaches choose a player for a fish-off. The referee chooses habitats 14 for them to play, and places the players at these selected habitats 14 with a coin toss, which the visitor calls.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A game for measuring and ranking the sport fishing skills of players, played on a course comprising a body of water having a plurality of designated and marked fishing locations, comprising the steps of:

fishing at a given said fishing location until a fish is caught, proceeding to the next said fishing location until all said fishing locations are fished, recording the number of casts required to catch a fish at each said fishing location, and computing scores for each player based at least in part on the total number of casts made by each player.

2. The game of claim 1, comprising the additional steps of:

weighing fish caught by each player and computing scores at least in part on the weight of the caught fish.

3. The game of claim 1, wherein the course additionally comprises a hazard for increasing the level of difficulty in fishing one of said fishing locations, comprising the additional step of:

negotiating said hazard while fishing at said fishing location.

4. A game for measuring and ranking the sport fishing skills of players, played on a course comprising a body of water having a plurality of designated and marked fishing locations, comprising the steps of:

fishing at a given said fishing location and carrying out a predetermined number of casts, proceeding to the next said fishing location and carrying out a predetermined number of casts until all said fishing locations are fished, recording the number of fish caught at each said fishing location, and computing scores for each player based at least in part on the total number of casts made by each player.

* * * * *